Patented May 26, 1925.

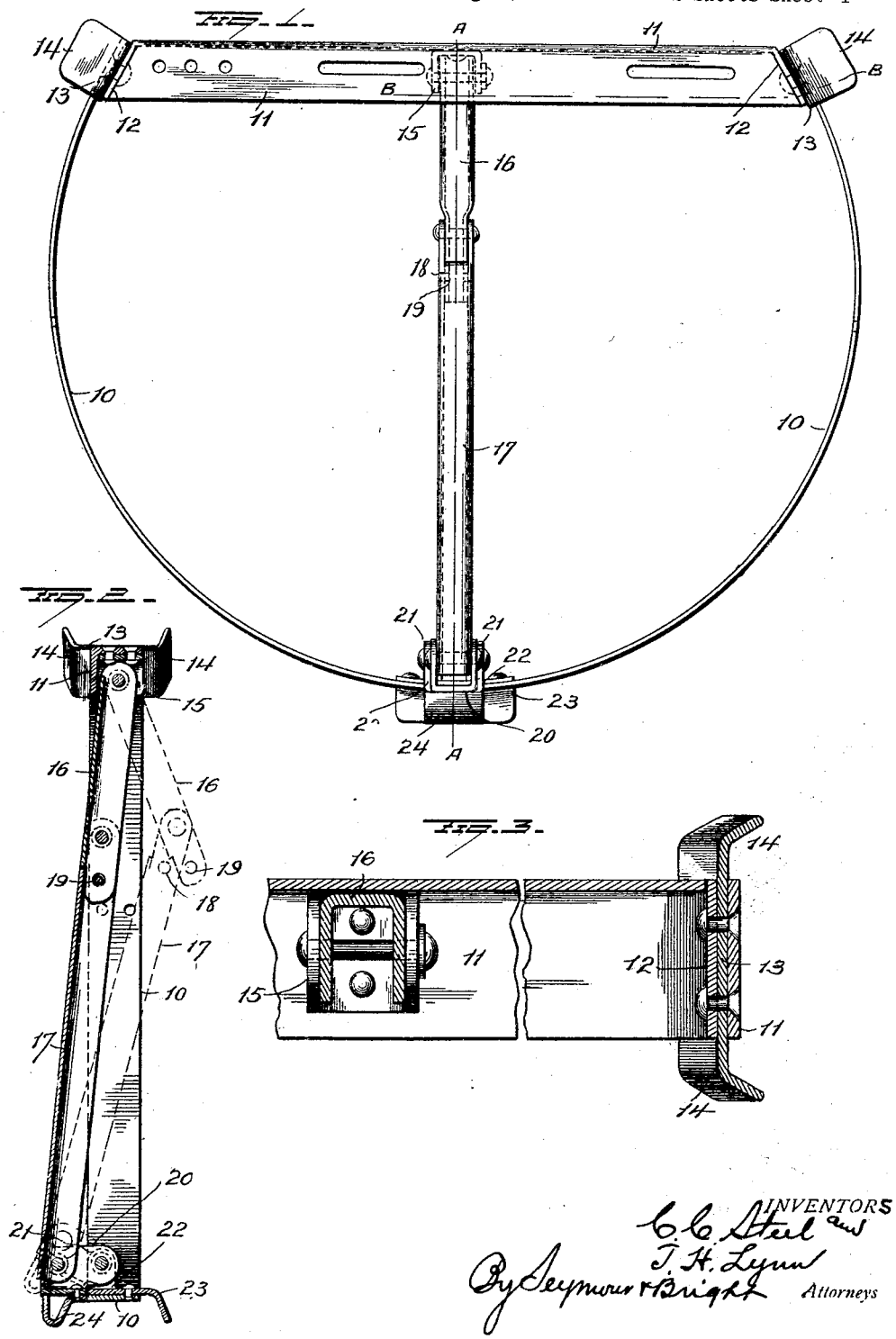

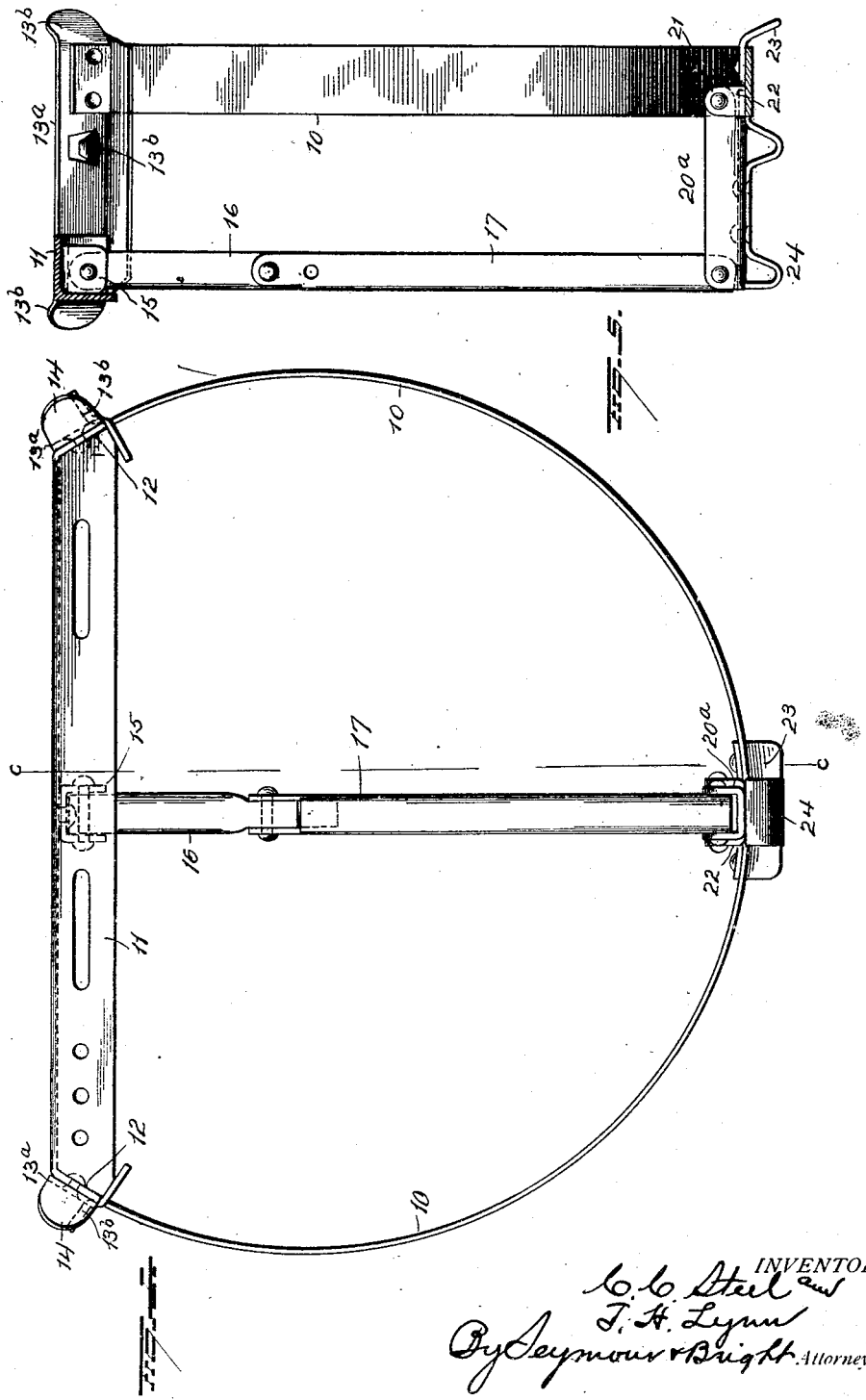

1,539,783

UNITED STATES PATENT OFFICE.

CHARLES C. STEEL AND THOMAS H. LYNN, OF WILLIAMSPORT, PENNSYLVANIA; SAID STEEL ASSIGNOR TO SAID LYNN.

TIRE CARRIER FOR AUTOMOBILES.

Application filed August 1, 1919. Serial No. 314,735.

*To all whom it may concern:*

Be it known that we, CHARLES C. STEEL and THOMAS H. LYNN, citizens of the United States, and residents of Williamsport, in the county of Lycoming and State of Pennsylvania, have invented certain new and useful Improvements in Tire Carriers for Automobiles; and we do hereby declare the following to be a full, clear, and exact description of the invention, such as will enable others skilled in the art to which it appertains to make and use the same.

Our invention relates to an improvement in tire carrier for automobiles, the object being to provide an improved device adapted to be secured at the rear end or at the side of an automobile for carrying one or more demountable rims or tires, and is designed particularly as an improvement on the construction disclosed in our pending application Serial Number 281,206 filed March 7th, 1919.

In the accompanying drawings; Figure 1 is a view in elevation of a tire carrier embodying our invention; Figure 2 is a view in section on the line A A of Figure 1; Figure 3 is a view in section on line B—B of Figure 1; Figure 4 is a view in elevation of a modified form of carrier and Figure 5 is a view in section on the line C—C of Figure 4.

10 represents a segment of a ring greater than a half circle, made of flat steel strap or band and of a size to snugly fit within a standard size rim and form a solid seat or support for the latter except at the top. This ring or seat should be no wider than the rim, and is preferably of less width, so that the latter will, when on its seat be directly engaged by the lugs on the seat and link, and be firmly held from any movement and against removal, except of course by the one having the key to the lock.

The free ends of the ring 10 are connected by the angle bar 11, the ends 12 of the horizontal member of which are bent to conform to the curvature of the band. Secured between the free ends of the ring or seat 10 and the bent ends 12 of the angle bar or brace 11 are the saddles 13, which are flat strips of sheet metal longer than the ring is wide with their two ends bent outwardly beyond the periphery of the ring to form shoulders or side supports 14 for the rim of the tire, the shoulders being inclined and separated sufficiently to receive and engage the opposite side edges of the rim of the tire and hold the latter against lateral displacement. The bent ends 12, of the angle bar 11, the saddles 13 and the free ends of the ring 10 are riveted together as shown, the angle bar passing in a straight line from one free end of the ring to the other and operating to prevent any spreading or collapsing of the ring and bracing the latter between the saddles.

Riveted or otherwise secured to the under face of the angle bar 11 is the bracket 15 to which one end of the short lever 16 is pivoted. This lever is preferably made of sheet metal bent into U-shape or channel form, and is pivotally connected near its other end to one end of a similarly constructed longer lever 17. The side members of lever 17 project at the end to receive between them the end of lever 16 and permit of the necessary movements of the two levers, and lever 16 is provided between its point of pivotal attachment with lever 17 and its free end, with a hole 18 which when the levers are in line, as will be hereinafter explained, alines with hole 19 in lever 17 for the passage of the hasp of a lock or other device for preventing the toggle levers thus formed from flexing.

Lever 17 is pivotally connected at its other end to the link 20 which is pivotally secured to the bracket 22 between the side members of the latter. This bracket is riveted to the inner face of the ring 10 midway between the saddles 13, and is bent inwardly at one end to form the side members 21, above referred to, and is bent outwardly as at 23 at its opposite end to form a fixed shoulder or abutment for the rim of the wheel. The link 20 is made of bar or sheet metal bent into U-shape and is provided on its outer face with a shoulder or abutment 24, also made from sheet metal bent as shown and riveted to the outer face of link 20, the said shoulder 24 coacting with shoulder 23 on the bracket for locking the wheel rim on the carrier.

As before explained, the levers 16 and 17 are pivotally connected, the lever 16 being pivoted at its outer end to the angle bar 11 and the lever 17 connected at its outer end to the pivoted link 20, the construction being such that when the two levers are in alinement, or in their closed and locking position, the link 20 will be held with its shoulder 24 projecting beyond the periphery of the ring or seat 10 and in a position to engage one side of the rim of a wheel. By removing the lock from the overlapping ends of the levers 16 and 19 and pushing forwardly on lever 17, the latter will be moved forwardly and upwardly thus turning link 20 and carrying the shoulder 24 of the latter upwardly and within the plane of the outer face of the ring or seat 10 so as to permit of the removal of a rim from or the placing of a rim on the ring or seat.

With this carrier the spare rim with or without a tire will be set in the saddles 13 with the air valve uppermost and above the angle bar 11, and can then be pushed onto the body or ring 10 and into engagement with the lower shoulder 23. After it has been thus seated, it can be locked in place by pulling rearwardly on the lever 17 which turns the bracket 20 on its pivot so as to carry shoulder 24 out and into contact with the edge of the rim thus locking the latter on the carrier against accidental displacement and by now locking the two levers 16 and 17 so as to prevent an unlocking movement, the tire will be secure against unauthorized removal.

In special cases where it is desirable to carry two tires, elongated saddles 13$^a$ and links 20$^a$ can be substituted for the short saddles and links above referred to. When the longer saddles and links are used we rivet the front ends of the saddles 13$^a$ to the free ends of the band or ring 10, and rivet the angle bar 11 to the rear ends of the saddles thus supporting the latter at both ends.

With this latter construction the saddles are provided with centrally located shoulders 13$^b$ formed by cutting and bending up lips from the metal of the saddles, and the link 20$^a$ is also provided with an extra shoulder for the second tire.

With both constructions it will be seen that when the toggle lever 16—17 is straightened out it acts as a brace and support for the ring and prevents sagging or distortion of the ring and rim thereon due to the weight and vibration. Again, the straightening out of the toggle lever pulls the rim down into the saddles and into close contact with the ring so that the rim will have bearing on the ring throughout the major part of the circumference of the latter.

The ring is designed to be secured to an automobile preferably at the rear thereof in the usual and well known manner.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. A spare tire carrier, the combination of a metal strap bent into the segment of a circle greater than a half circle and of a size to fit within a standard size rim and form a seat or support for the same except at the top, a brace connecting the ends of the strap, a saddle at each end of the strap, a link pivoted to the inner face of the strap intermediate the saddles, the said link being provided at its outer end with a shoulder, and a toggle lever pivoted to the brace and to the link for moving the shoulder on the latter into and out of locking position.

2. In a spare tire carrier, the combination of a metal strap bent into the segment of a circle greater than a half circle and of a size to fit within a standard size rim and form a seat or support for the same except at the top, a brace connecting the ends of the strap, a saddle at each end of the strap, each saddle having outwardly inclined shoulders, a fixed shoulder on the strap intermediate the saddles, a pivoted link having a shoulder to coact with said fixed shoulder for locking the rim to the carrier and a toggle lever pivoted at one end to the brace and at its other end to the link for moving the shoulder on the latter into and out of locking position.

3. In a tire carrier, the combination of seat curved to conform to the tire rim and greater than a half circle, and having a flat upper portion, a saddle at each juncture of the curved and flattened portion of the seat, each saddle having outwardly projecting inclined shoulders to engage the opposite side edges of a tire rim, a link pivoted to the inner face of the curved part of the seat approximately midway between the saddles, the said link having a rim engaging shoulder, and a toggle pivotally connected at one end to the flattened part of the seat and pivotally connected at its other end to the link for removing the latter into and out of locking position.

4. In a tire rack, a rim bar in the form of a segment of a circle, short bars secured at one end to the ends of said rim bar and extending transversely of said ends, the ends of said short bars being bent laterally and the centers of said bars having laterally stamped lugs to form seats for a plurality of rims, a connecting bar secured to the ends of said transverse bars opposite the ends thereof connected to said rim bar, an additional rim seat on said rim bar opposite said connecting bar, spaced abutments, one of said abutments forming one side of said additional seat, a member carrying said abutments and mounted on said rim bar, and means for operating and holding said member, said means reacting on said connecting bar.

5. In a tire rack, a pair of spaced parallel short bars formed of angle metal, one flange of each bar having a longitudinal slot at one end, the other flange of each bar being bent laterally at its ends and provided with an outwardly stamped lug at its center, said bent ends and lug coacting in forming seats for two rims, a segmental rim bar passing at its ends through the slots of said first named flanges and secured to the adjacent ends of the other flanges, an angle metal connecting bar having one of its flanges bent laterally at its ends, said bent flange ends being secured to said other flanges of said short angle metal bars, at the ends of the latter remote from said rim bar, a rim holding member movably mounted on the central portion of said rim bar, and means for operating and securing said holding member, said means reacting on the center of said angle metal connecting bar.

6. A tire carrier comprising a member of substantially circular form and having an extent greater than half and less than a whole circumference, a bar connecting the ends of said member, rim-supporting members secured at opposite sides of said first named member, a rim-engaging lug fixed on said first named member opposite said bar, co-acting rim-engaging lug structure adjacent said fixed lug and movable with respect thereto, and means for actuating said lug structure to position to hold a rim comprising means engaging said lug structure and said bar.

7. A tire carrier comprising a member of substantially circular form and having an extent greater than half and less than a whole circumference, a bar connecting the ends of said member, rim-supporting members secured at opposite sides of said first named member, a rim-engaging lug fixed on said first named member opposite said bar, a lug co-acting with said fixed lug, a member pivoted to said first named member carrying said coacting lug, and a toggle comprising links pivoted to each other and to said pivoted member and said bar.

8. A carrier for a plurality of rims comprising a ring member of substantially circular form and of an extent greater than half and less than a whole circumference, transverse extending rim supporting members each secured at one end to said ring member upstanding lugs at the ends and middle of said rim supporting members, a cross bar connecting the other ends of said rim supporting members, a lug fixed on said first named member at a distance from said rim supporting members, a link pivoted to said first named member adjacent said lug, a pair of lugs movable with said link, and a toggle connected to said cross bar and said pivoted link.

9. A spare tire carrier comprising an approximately U-shaped metal strap having curved side portions adapted to snugly fit a spare tire rim, a separately formed brace bridging the space between the opposite end portions of the strap at points adapted to leave a substantial segmental space between the brace and any spare rim placed thereover, means connecting said end portions of the strap and brace, saddles at the junction points thereof, spare rim engaging means at the lower portion of the strap, and means for operating and setting the latter for drawing a spare rim into firm seating relation with the saddles and curved side portions of the strap.

10. A spare tire carrier comprising an approximately U-shaped metal strap having curved side portions adapted to snugly fit a spare tire rim, a separately formed brace bridging the space between the opposite end portions of the strap at points adapted to leave a substantial segmental space between the brace and any spare rim placed thereover, means connecting said end portions of the strap and brace, saddles adjacent the junction points thereof, spare rim engaging means at the lower portion of the strap, and means adjustable transversely of the latter for operating the same to force a spare rim downwardly and into firm seating relation with the saddles and curved side portions of the strap.

11. A spare tire carrier comprising an approximately U-shaped metal strap having curved side portions adapted to fit a spare tire rim, a separately formed brace bridging the space between the opposite end portions of the strap, saddles at the junction points thereof, common means for securing the end portions of the brace, strap, and the saddles together, spare rim engaging means at the lower portion of the strap, and means for operating and setting the latter for drawing a spare rim into firm seating relation with the saddles and curved side portions of the strap.

12. A spare tire-carrier comprising an approximately U-shaped metal strap having curved side portions adapted to fit a spare tire rim, a separately formed brace bridging the space between the opposite end portions of the strap, said brace having end flanges, saddles at the junction points between the strap and brace, common means for securing the flanges of the brace, end portions of the strap, and the saddles together, spare rim engaging means at the lower portion of the strap, and means for operating and setting the latter for drawing a spare rim into firm seating engagement with the saddles.

13. A spare tire carrier comprising an approximately U-shaped metal strap adapted to fit within a spare tire rim, a separately formed brace bridging the space between the opposite end portions of the strap, said brace having end flanges, saddles arranged between the brace flanges and the ends of the strap, means for securing said flanges, end portions, and saddles together, spare rim engaging means at the lower portion of the strap, and means for operating and setting the latter for drawing a spare rim into firm seating engagement with the saddles.

14. A spare tire carrier comprising an approximately U-shaped metal strap adapted to fit within a spare tire rim, a separately formed brace bridging the space between the opposite end portions of the strap at points adapted to leave a substantial space between the brace and any spare rim placed thereover, saddles adjacent to the junction points between the brace and strap, instrumentalities for securing the brace, the saddles, and the strap in cooperative association, spare rim engaging means at the lower portion of the strap, and means for operating and setting the latter for drawing a spare rim into firm seating engagement with the saddles, said last mentioned means including a member movable in a direction axially of the strap.

15. A spare tire carrier comprising an approximately U-shaped metal strap adapted to fit within a spare tire rim, a separately formed brace bridging the space between the opposite end portions of the strap at points adapted to leave a substantial space between the brace and any spare rim placed thereover, saddles adjacent to the junction points between the brace and strap, instrumentalities for securing the brace, the saddles, and the strap in cooperative association, spare rim engaging means at the lower portion of the strap formed and arranged to draw a spare rim inwardly, and downwardly into firm seating engagement with the saddles, and means for operating and setting said last mentioned rim engaging means.

16. A spare tire carrier comprising an approximately U-shaped metal strap adapted to fit within a spare tire rim, a separately formed brace bridging the space between the opposite end portions of the strap at points adapted to leave a substantial space between the brace and any spare rim placed thereover, saddles adjacent to the junction points between the brace and strap, instrumentalities for securing the brace, the saddles, and the strap in cooperative association, spare rim engaging means at the lower portion of the strap formed and arranged to draw a spare rim inwardly, and downwardly into firm seating engagement with the saddles, and means for operating and setting said last mentioned rim engaging means, said operating means including an actuating member movable in a direction axially of the strap.

17. A spare tire carrier comprising an approximately U-shaped metal strap adapted to fit within a spare tire rim, a separately formed brace of angle metal bridging the space between the opposite end portions of the strap, said angle metal brace being provided with end flanges, saddles arranged at the junctures between the brace and strap, means for securing the flanges, strap end portions, and saddles together, spare rim engaging means at the lower portion of the strap, and means for operating and setting the latter for drawing a spare rim into firm seating engagement with the saddles, one flange of the angle metal brace being arranged in an approximately upright position and formed for attachment of appurtenances, such as a license tag, lamp, etc., thereto.

In testimony whereof, we have signed this specification.

CHARLES C. STEEL
THOMAS H. LYNN.